Nov. 17, 1925. 1,561,611

A. C. LINDGREN

CLUTCH

Original Filed April 30, 1919

Inventor:
Alexus C. Lindgren,
By H. P. Doolittle
Atty.

Patented Nov. 17, 1925.

1,561,611

UNITED STATES PATENT OFFICE.

ALEXUS C. LINDGREN, OF ST. CHARLES, ILLINOIS, ASSIGNOR, BY MESNE ASSIGNMENTS, TO FRED GERLACH AND ARNOLD B. KELLER, TRUSTEES, BOTH OF CHICAGO, ILLINOIS.

CLUTCH.

Original application filed April 30, 1919, Serial No. 293,756. Divided and this application filed November 27, 1922. Serial No. 603,413.

*To all whom it may concern:*

Be it known that I, ALEXUS C. LINDGREN, a citizen of the United States, residing at St. Charles, in the county of Kane and State of Illinois, have invented certain new and useful Improvements in Clutches, of which the following is a full, clear, and exact specification.

This invention relates to intermittently actuated clutches of the kind used in connection with power lift mechanisms of the traction actuated type and this application is a division of my application Serial No. 293,756, filed April 30, 1919, Pat. No. 1,440,924, Jan. 2, 1923, for improvements in power lift plows.

The principal object of the invention is to provide an intermittent clutch of the internal pawl and ratchet type that will operate during one actuation to positively raise an implement frame at a speed governed by the rotation of the traction wheel that drives the clutch and that will act during the succeeding actuation to limit the speed at which the implement frame is lowered; as distinguished from previous clutches of this type as for instance that shown in the patent to Lindgren et al. No. 1,394,914, October 25, 1921, where the clutch operates to lift in the manner above stated but does not control the speed of lowering, the implement frame dropping of its own weight when the clutch is thrown in.

With the aforesaid main object and other minor objects in view, the invention resides in the combination of elements and details of construction hereinafter described and defined in the claims.

Referring to the drawings—

In the present instance, my invention is shown in connection with a plow of the so-called frameless type in which the plow beams themselves compose the frame which is raised and lowered on crank axles. It will be understood that one crank axle is located on each side of the machine and that they are connected for joint movement, one of these crank axles supporting the power lift mechanism to be described.

Figure 2:
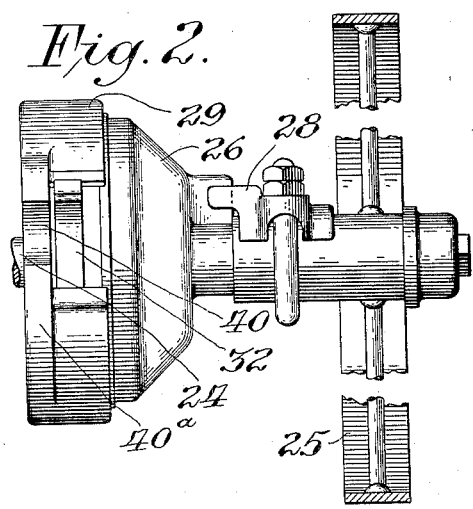
Fig. 2 is a front view of the clutch in position on the wheel spindle.
Figure 3:
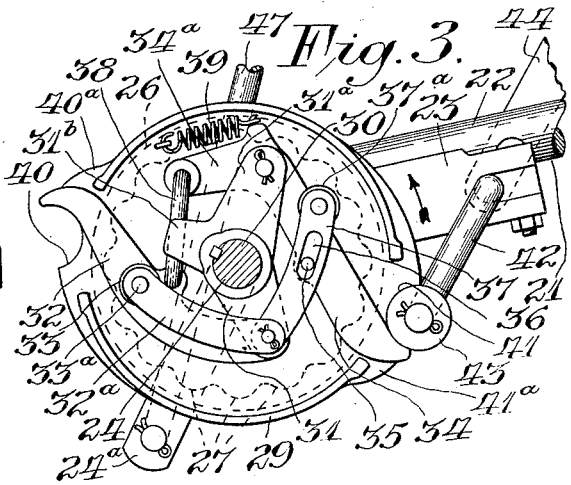
Fig. 3 is a side view of the clutch with its driving element or casing omitted except as indicated in dotted lines and showing the parts in non-working position.
Figure 5:
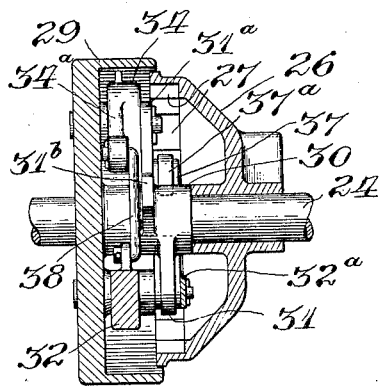
Fig. 5 is a vertical transverse section through the clutch taken on the line 5—5 of Fig. 4.
Figure 4:
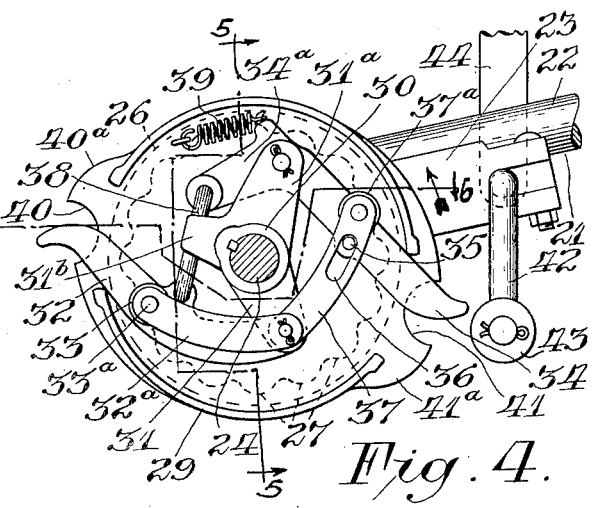
Fig. 4 is a similar view with the parts in working position.

The crank axle on which the power lift device is mounted extends forwardly and downwardly from the implement frame and has a horizontal portion 21 journaled thereon. Its crank arm 22 has its lower end bent inwardly and to this end there is secured in any suitable manner a member or bracket 23 in which there is journaled a transversely extending shaft 24, the outer end of which projects some distance beyond the crank 22 and has journaled thereon a traction wheel 25. The other end of this shaft 24 is provided with a crank 24$^a$ which will be hereinafter referred to. On shaft 24 adjacent wheel 25 there is also journaled a rotatable clutch element 26 having internal notches 27 around its periphery as shown in dotted lines in Figs. 3 and 4. The clutch element 26 is constantly driven by wheel 25 through any suitable connection such as the lug 28 positioned to engage a complemental projection on the clutch member 26 as clearly shown in Fig. 2. A second, normally stationary, clutch element 29 is keyed or otherwise fixed to shaft 24 in co-operative relation with clutch member 26 and is formed with a horizontally extending peripheral flange, the edge of which extends over the clutch member 26. The member 29 is also provided with a laterally extending hub 30 which extends within the casing or member 26 of the clutch and this hub has a radially extending arm 31 on which is pivotally connected a trip dog or lever 32 having a roller 33 journaled thereon at a point near its middle on a pin 33$^a$, the outer end of which is supported by a supplemental arm or brace 32$^a$. This roller 33 is in position to engage the notches 27 in the rotatable clutch element 26. The hub 30 is also provided with a second radially extending arm 31$^a$ to which is pivotally mounted another trip dog 34. The dog 34 has a pin 35 thereon which engages in a slot 36 in a pawl arm 37 which is directed oppositely to the dog or lever 32 and is pivoted on arm 31 at the same point as the dog 32. A roller 37ª similar to the roller 33 is carried by the pawl arm 37 and is positioned to engage the internal notches 27 on the opposite side of shaft 24 from those engaged by the roller 33 and thus prevents reverse rotation of clutch element 26 during engagement of the clutch. The dog 34 has an angular extension 34ª which is connected to the dog 32 by means of a link 38 so that the rollers 33 and 37ª are simultaneously moved into and out of engagement with the notches 27 when either of the dogs 32 or 34 are tripped, the movement of dog 34 being communicated to pawl 37 through pin 35 and the two trip dogs being made to move together through link 38. A contractile spring 39 which connects the member 29 of the clutch with a stud on dog 34, as shown in Figs. 3 and 4, serves to normally keep the parts in a position of engagement and a stud 31ᵇ on hub 30 serves to retain link 38 in position. The stationary clutch element 29 is provided at spaced points on its outer periphery with two notches 40 and 41 which are formed in projecting flanges 40ª and 41ª, the edges of which are shaped to provide a gradually rising surface on which a trip roller, to be described, is adapted to seat. The trip controlling the clutch comprises a crank lever 42 which has its middle portion journaled in the bracket 23 and one arm extending downwardly below the crank 22 so that its end is positioned near the periphery of the clutch member 29. On this lower end of the lever there is journaled a trip roller 43 which is adapted to fit into the notches 40 and 41 heretofore referred to. The other end of lever 42 is extended upwardly as an arm 44 to the end of which a control rope 45 is attached. A compression spring 46 mounted on a rod which extends between lever arm 44 and an abutment on bracket 23 acts to keep roller 43 in contact with the periphery of clutch member 29. It will be seen by reference to Figs. 3 and 4 that the outer ends of trip dogs 32 and 34 are positioned to project beyond the horizontal flange on casing 29 through suitable openings therein at points adjacent the notches 40 and 41. It follows, therefore, that the projecting end of one of the trip dogs will be engaged by roller 43 on the trip lever as it drops into either of the notches 40 or 41 causing both trip dogs to swing inwardly and withdrawing the rollers from the notches 27, the engagement of roller 43 in either notch also serving to lock member 29 against further movement in its normal direction of rotation. A pull on rope 45 serves to withdraw the roller 43 from its seat thereby allowing the trip dogs to swing outwardly and clutch rollers 33, 37ª to engage the constantly driven member 26 of the clutch and causing rotation of member 29 and shaft 24 therewith until roller 43 (which, as the rope 45 is released, rides on the outer periphery of member 29) will have engaged the opposite notch and stopped further movement of clutch element 29 and shaft 24. It will, therefore, be seen that at each actuation of the clutch approximately a half revolution is transmitted to shaft 24, swinging its crank 24ª from substantially upright position to a substantially pendent position or vice versa. These successive operations of shaft 24 and its crank 24ª are caused to swing the crank axle upwardly and downwardly, thereby raising and lowering the implement frame, through the medium of a link or connecting rod 47 which has its lower end pivoted to the crank 24ª and its upper end pivoted to a fixed point on the frame such as an adjusting lever 48. This lever may be pivoted at its lower end as at 49 and adapted to be locked in various positions in a manner to adjust the position of the crank 22. It will be evident that when the implement frame is in raised position and the crank 24ª on shaft 24 is in substantially upright position that throwing in the clutch would ordinarily cause the weight of the implement frame to rotate shaft 24 faster than the normal speed of that shaft as received from wheel 25 thus allowing the plow frame to drop to the ground, and this is the action that occurs in single action clutches of the type seen in the patent referred to above. With the construction here described, however, the second clutch roller (37ª), which is oppositely directed from its companion roller, prevents rotation of the clutch member 29 under weight of the implement frame and the lowering action is thus restricted in speed to that permitted by rotation of the traction wheel. The implement frame is accordingly lowered mainly by its own weight but under control of the clutch, and the implement frame is both raised and lowered at a constant speed.

Figure 1:
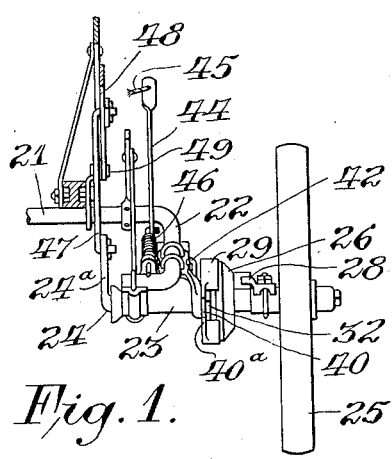
Fig. 1 is a partial front view of a plow showing the crank axle carrying the clutch and lifting connections.
Figure 6:
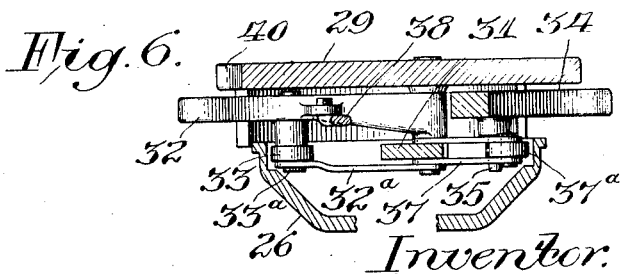
Fig. 6 is a horizontal section taken on the line 6—6 of Fig. 4.

With the foregoing structure in mind it will be clear that member 26 rotates with wheel 25 in the direction of the arrow in Figs. 3 and 4. So long as trip roller 43 is seated in a notch 40 of member 29 and in engagement with either dog 32 or 34 (Fig. 3), these dogs, through the connection 38, will both be pressed inwardly, together with the two engaging rollers 33 and 37ª. These rollers are laterally positioned with respect to the dogs 32 and 34 and are in a plane with the circumferential notches 27 on the inside of the rim of member 26 (Fig. 6) and when trip arm 42 is swung to withdraw roller 43 (Fig. 4) the dogs and the engagement rollers will be swung outward under the influence of spring 39 and the rollers 33 and 37ª will engage and seat in notches 27 at opposite sides of member 26. Engagement of roller 33 forces member 29 and shaft 24 to rotate with member 26, and the trip roller 43, upon return of trip arm 42, will travel on the outer periphery of member 29 until it seats in the next notch 40 and again disengages the clutch members. In previous clutches of this type employing a single engaging roller, withdrawal of trip arm 42, when the plow frame was raised as in Fig. 1, would cause the weight of the frame as it dropped to turn crank 24ª and shaft 24 at a greater speed than that of member 26, the single roller (equivalent to roller 33 alone) permitting forward racing of member 29 in the direction of rotation of member 26. With pawl 37 and roller 37ª incorporated in the mechanism this racing is prevented as roller 37ª locks member 29 against faster movement than permitted by member 26 and the plow frame is, therefore, raised and lowered at uniform speed as before stated.

It will be understood that the present disclosure exemplifies but one form of the invention and that modifications may be made within the scope of the following claims.

I claim as my invention:

1. A clutch for power lift plows comprising a normally rotatable element and a normally stationary element mounted on a shaft, one element being journaled on the shaft, the other fixed on the shaft, one element having internal depressions, the other element having oppositely directed members for engaging said depressions hinged about a point eccentric to the shaft, and means for locking the two elements together and for locking the stationary member in a fixed position including a trip member engaging the periphery of said elements.

2. A clutch for power lift plows comprising a normally rotatable element and a normally stationary element mounted on a shaft, one element being journaled on the shaft, the other fixed on the shaft, the normally rotatable member having internal notches, means co-operating with the normally stationary element for locking it against further movement after each approximate half revolution thereof, and carrying arms hingedly mounted at one side of the shaft and swingable outward about said hinge and in opposite directions to engage the internal notches on opposite sides of the shaft to lock said elements together against movement in either direction.

3. A clutch for power lift plows comprising a normally rotatable element and a normally stationary element mounted on a shaft, one element being journaled on the shaft, the other fixed on the shaft, the normally rotatable member having internal notches, means co-operating with the normally stationary element for locking it against further movement after each approximate half revolution thereof, and carrying arms hingedly mounted at one side of the shaft and swingable outward about said hinge and in opposite directions to engage the internal notches on opposite sides of the shaft to lock said elements together against movement in either direction, the means for locking the stationary element against rotation and the means for locking the two elements together being operatively connected.

4. A clutch for power lift plows comprising a shaft, a rotating driving member journaled thereon and provided with a laterally projecting peripheral rim, a normally stationary driven member fixed on the shaft, said driven member and shaft being subject at intervals to a force tending to rotate them in the same direction and at greater speed than the driving member, and means for interlocking said members for joint rotation at uniform speed comprising oppositely swinging pivoted trip dogs carried by the driven member and having engaging elements positioned within the rim of the driving member adapted to interlock therewith at substantially diametrically opposite points, and trip mechanism acting to automatically disconnect said dogs and lock the driven member after approximately each half rotation thereof.

In testimony whereof I affix my signature.

ALEXUS C. LINDGREN.